May 30, 1939.  E. M. SPLAINE ET AL  2,160,686
CONNECTING MEANS AND METHOD OF MAKING SAME
Filed Nov. 25, 1935
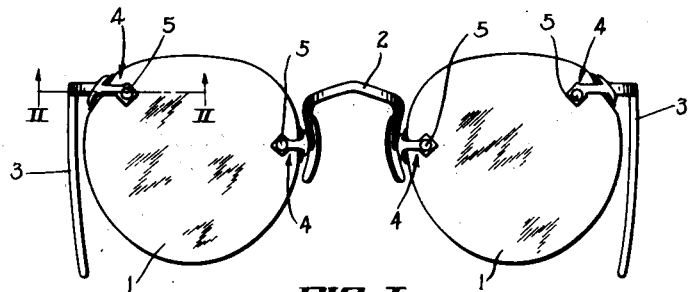
FIG. I
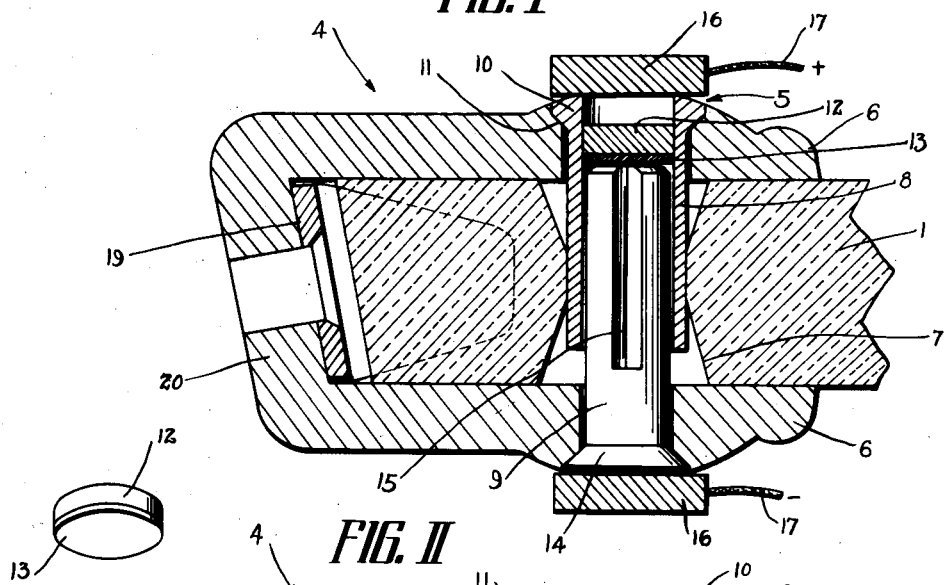
FIG. V
FIG. II
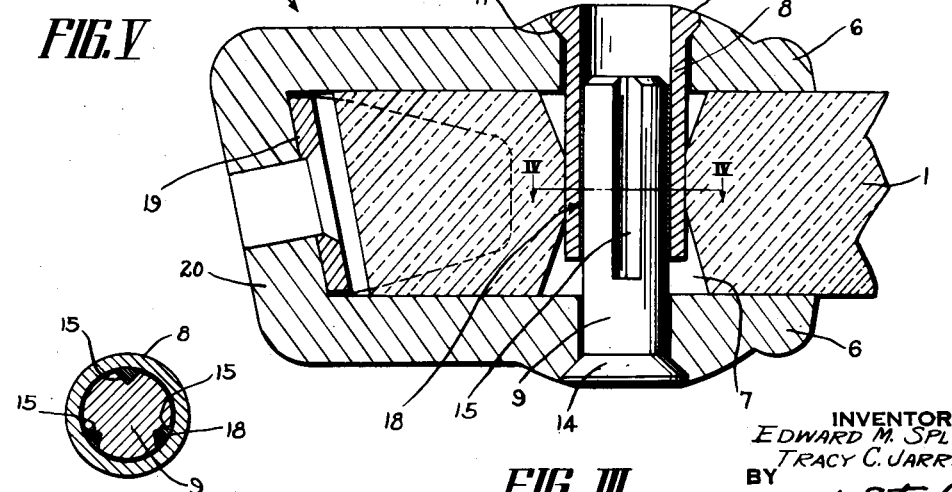
FIG. IV
FIG. III
INVENTOR
EDWARD M. SPLAINE
TRACY C. JARRETT
BY
Harry H. Styll
ATTORNEY Patented May 30, 1939

2,160,686

UNITED STATES PATENT OFFICE 2,160,686

CONNECTING MEANS AND METHOD OF MAKING SAME

Edward M. Splaine and Tracy C. Jarrett, Southbridge, Mass., assignors to American Optical Company, Southbridge, Mass., a voluntary association of Massachusetts Application November 25, 1935, Serial No. 51,429

2 Claims. (Cl. 113—112)

This invention relates to improvements in connecting or securing means and has particular reference to an improved method of making and assembling the same.

One of the principal objects of the invention is to provide improved connecting or securing means of the type utilizing solder or the like for integrally joining the parts of the connecting or securing means and method of making the same whereby a more positive and desirable soldering operation may be performed.

Another object is to so form and treat the parts of connecting means for joining the operable and/or separable parts of an ophthalmic mounting whereby the prior art difficulty encountered due to the tendency of the parts to become oxidized when exposed to atmosphere is utilized as a means controlling the performing of a more desirable and positive soldering operation.

Another object is to provide connecting means of the character described so formed as to enable the performing of a simple, efficient and accurate soldering operation wherein a more positive flow of the solder between the parts of the connecting means to be united is insured.

Another object of the invention is to provide an improved method of applying flux to the parts of the connecting means during the manufacture thereof whereby the prior art undesirable wet fluxing of the parts during the soldering operation is eliminated.

Other objects and advantages of the invention will become apparent from the following description taken in connection with the accompanying drawing and it will be apparent that many changes in the arrangement of parts, details of construction and steps of the process may be made without departing from the spirit of the invention as expressed in the accompanying claims. We, therefore, do not wish to be limited to the exact details shown and described as the preferred forms and operations only have been shown by way of illustration.

Referring to the drawing:

Fig. I is a front elevation of a conventional type ophthalmic mounting embodying the invention;

Fig. II is an enlarged fragmentary sectional view taken on line II—II of Fig. I and looking in the direction indicated by the arrows and illustrating the relation of the parts prior to the application of heat thereto;

Fig. III is a view similar to Fig. II showing the relation of the parts after the application of heat;

Fig. IV is a detailed sectional view taken through the connecting means of Fig. III as on line IV—IV; and Fig. V is a perspective view of the solder disk showing the relation of the solder flux thereto.

It has been usual in the past in the art of forming solder united connecting means of the character described to make one of the connecting members in the form of a tube having a wad of solder internally thereof and the other in the form of a pin to be fitted in telescoped relation with the tube and to be joined thereto by the solder. Such connecting members were made in large quantities for use as occasions arose similar to screw type connecting means and after exposure to atmosphere the surfaces thereof, as well as the exposed surfaces of the solder, soon become oxidized, with the result that the solder would not readily melt and flow when heated and would not adhere to the surfaces of the pins and tubes which were to be joined. To overcome this difficulty the pins and tubes were dipped in a wet resinous flux prior to being placed in assembled relation with each other in the means to be joined. The assembly was then placed between spaced contacting elements of an electrically operated heating unit whereby the heat generated by said unit would melt the solder with a view to having it flow between the pin and tube and when cool to adhere thereto and form an integral connection. Although this type of connecting means was very desirable from the standpoint of ease in assembling the parts, much difficulty was encountered in obtaining a desirable solder connection.

One of the difficulties was that the amount of flux used could not be controlled and during the soldering operation it would flow over the contacting elements of the heating unit and during continued use a film of flux or a decomposition thereof would form on the contacting elements and prevent their obtaining a good electrical contact with the work with a result that sufficient heat could not be generated to perform the soldering operation. This forming of a film on the contacts was very troublesome as it required continual cleaning during use.

Another difficulty was that during the heating of the parts the wet flux would form a gas internally of the tube between the wad of solder and adjacent end of the pin and due to the required relatively intimate fit of the pin and tube the said gas could not escape. This gas expansion, caused an internal pressure and when the solder became molten would cause the said solder to be forced in a direction outwardly of the tube towards the contact element of the heating unit rather than allowing it to flow between the inner adjacent surfaces of the pin and tube as desired. In many instances, when the electrical current was shut off, it was found that instead of integrally joining the pin and tube, the solder had integrally secured the tube with the contact causing much difficulty in removing the assembly from the soldering machine and also failing to perform the function desired.

Another difficulty, particularly in instances when the parts were formed of yellow gold or other precious metal, was that the gas extrusion of the solder would cause it to flow over the outer surface of the parts and produce an untidy and undesirable connection.

It, therefore, is one of the principal objects of this invention to overcome all of the above difficulties by providing an arrangement whereby a more positive and desirable soldering operation may be performed without enhancing the utility of the heat unit, and to so construct the connecting members that the oxidation of the parts will be an asset rather than a hindrance to the performing of a desirable soldering operation as has been usual in the past.

Referring more particularly to the drawing wherein like characters designate like parts throughout the several views, the device embodying the invention is shown applied to a conventional ophthalmic mounting comprising a pair of lenses 1, connected by a bridge member 2 and having temples 3 for supporting the mounting on the face of the wearer. The bridge member 2 and temples 3 are connected to the lenses by means of lens straps or clamps 4 attached to the lenses by the connecting means 5 embodying the invention.

Referring more particularly to Figs. II and III, the lens straps 4 are provided with a pair of spaced lens face engaging portions 6, each having a perforation therein aligned with an opening 7 formed in the lens in which the connecting means 5 is secured to hold the parts in assembled relation with each other.

The connecting means 5, as shown in Fig. II, comprises preferably a tubular member 8 and a pin member 9. The tubular member 8 is provided with an enlarged head 10 adjacent one end thereof formed with a tapered face 11 adapted to engage a tapered counterbore in the opening of the adjacent face engaging portion 6. The tubular member 8 is provided with a wad of solder 12 which is pressed internally thereof and into frictional binding relation with the inner wall of the tube. In this particular instance, the wad of solder 12 is provided on its inner face with a coating of flux 13 which protects the inner surface of the solder against oxidation when the parts are exposed to atmosphere. A detailed description of the characteristics and function of this flux will be given hereinafter. The pin member 9 is provided with an enlarged head portion 14 formed with a tapered inner face adapted to engage with the tapered counterbore in the adjacent lens face engaging portion 6 in a manner similar to the head of the tubular member. The pin member 9 is shown in Figs. II to IV, inclusive, provided with a plurality of longitudinal grooves 15, adapted to provide passageways between the inner wall of the tube and the pin member through which any gas formation internally of the tubular member may escape. These longitudinal grooves provide increased surface bearing for the solder and also retain more flux and provide room for the flow of solder downwardly of the pin. It is specifically pointed out that the longitudinal grooves 15 extend below the inner extremity of the tube 8 so as to provide a ready outlet for and to prevent the expansion of gas internally of the connecting members, the grooves may be straight, curved, or any shape desired.

After the longitudinal grooves 15 have been formed in the shank of the pin 9 and the pin has been provided with suitable precious metal coatings and surface finish as desired, the said pin is provided with a coating of flux.

The pin 9 and tubular member 8, as described above, are placed in telescoped relation with each other in the aligned openings in the lens and lens face engaging portions of the lens strap, as shown in Fig. II, and are placed between spaced contacting members 16 connected by means of the lead wires 17 to a suitable source of electrical or other desirable heat generating energy to heat the said contacts. In the case of connecting the spaced contacts with a source of electrical energy suitable means such as a switch, rheostat or other means is provided for controlling the duration of the flow of electricity through the parts to control the amount of heat applied thereto. The heat generated by the heating units is adapted to melt the wad of solder 12 and flux 13 and cause the same to flow downwardly between the pin and tubular member as illustrated at 18 in Figs. III and IV and when cool to integrally unite the same.

Suitable resilient lens edge engaging means 19 may be provided on the edge portion 20 of the lens strap for resiliently taking up what looseness and play there might be in the connection of the strap to the lens and to provide means for absorbing strain and shock of the lens holding means or lens strap on the lens.

It has been usual in the prior art to utilize a similar pin and tubular type connecting means, but the structure of the pin, the procedure of applying flux to the parts to be united, the nature of the flux, and the procedure of completing the soldering operation were decidedly different and caused much difficulty and failure in obtaining an efficient connection.

It has been usual in the past to pre-flux the pins and tubes with a resin flux which left a small amount of flux on the surfaces thereof. Along with the pre-fluxed pins and tubes, a special wet flux was applied to the pin. When the assembly was placed between the electrodes of the heating unit and heat was applied thereto to complete the soldering operation, a black residue was formed which darkened up the surface of the assembly and corroded the electrodes. The resin present on the parts formed a gummy mass on the end of the electrodes and after repeated operations a poor contact between the electrodes and tube and pin members resulted. This gummy or resinous mass would prevent the obtaining of a good electrical contact of the electrodes with the pin and tubular members and brought about failure in the solder uniting of the parts. This was due, in most instances to insufficient heat generation and the failure of the solder to become molten enough to flow.

Another difficulty with the prior art arrangement was that the exposed surfaces of the pin and tubular members and solder means associated with the tube would become oxidized when exposed to atmosphere and this oxidation also prevented ready flowing of the solder and hindered its adhering to the surfaces to be united.

To overcome the above difficulty, applicants preferably form the pin and tubular members to the desired shape and size. They then cover the pins with a flux preferably formed of a solution comprising:

10 grams of ethylene diamine dihydrochloride
45 c. c. of water, and
45 c. c. of denatured ethylalcohol.

The water and alcohol are mixed first and the ethylene diamine dihydrochloride compound added thereafter.

The pins are placed in the flux and after a few minutes the flux is poured off. The pins are then allowed to dry, leaving only a thin layer of relatively dry flux thereon. This flux prevents their becoming oxidized when exposed to atmosphere. The drying may be hastened by placing the pins in a drying oven maintained at a temperature between 110–115° C. or at a temperature which is such that it will not decompose the compound. The solder which under normal conditions readily oxidizes is preferably sanded or otherwise cleansed on one side to remove the oxide, it is then dipped or otherwise treated with the flux and dried in a similar manner as the pins. The unsanded or uncleansed surface, after drying, is wiped with a damp cloth to remove the small amount of flux that might adhere to it. The solder is then pressed or otherwise placed in the tube with its fluxed surface on the inside or side towards the pin. The tube and pin type connecting means thus formed is carried in stock similar to screws or the like for use as occasions arise.

When exposed to atmosphere the usual oxidizing of the unprotected surface of the solder takes place and, as arranged in the present device, it is on the side towards the head of the tube or side opposite the direction in which the solder is to flow during the soldering operation. As previously stated, an oxidized surface on solder will not melt and flow at a temperature sufficient to melt an unoxidized surface and when the parts are subjected to heat the fluxed surface will, therefore, be the first to melt. The natural tendency of the solder to follow the path of least resistance will cause it to flow between the pin and tube. The oxidized surface being the last to melt acts as a dam preventing the flow of solder outwardly of the tube and preventing its flowing over the outer surfaces of the parts as in the prior art. During the soldering operation the flux on the solder and the flux on the pin, melt at a lower temperature than the solder and flow between the pin and tube and thereby prepare the said surfaces for the flow of solder which immediately follows. The grooves in the pin provide a ready outlet for the gas which forms during the heating and melting of the flux and insures a more positive and accurate soldering operation. The flux being of a nongummy nature does not form a film on the contacts of the heating unit and enables the continual obtaining of good electrical contact.

Although applicant preferably coats only the pin with flux it is apparent that the solder may first be placed in the tube and the said tube and solder may thereafter be coated with flux and dried in a manner similar to the pins. The first method, however, is the preferable procedure to follow.

Although it has been found from practice that a good flux may be formed by the above procedure it is to be understood that this invention is not to be limited to the use of this particular flux as many other fluxes of a similar nature might be used.

During the assembling and uniting of the parts of the device embodying the invention no wet fluxing is necessary and the difficulties encountered through the use of such a flux have been eliminated.

It has been found from practice that the present arrangement enables the performing of a very desirable and positive solder connection in a minimum amount of time and with less heat generation than has been necessary in the past. This reduction in the heat required during the soldering operation is a decided advance in the art, as it reduces the breakage of lenses due to over heating and removes a defect which has been very costly in the past. With the present arrangement the breaking of a lens due to over heating seldom occurs.

From the foregoing description it will be seen that simple, efficient and economical means and method have been provided for obtaining connecting means of the character described.

Having described our invention, we claim:

1. The method of forming connecting means and uniting the parts of an opthalmic mounting comprising forming a connecting member with a recess and a separate connecting member with a projection which may be fitted in said recess by sliding axial movement, providing said separate connecting member with a groove which when the said members are in assembled relation with each other will lie between the contiguous surfaces thereof, providing each of said connecting members with means which during use will positively associate them with the parts of the mounting so that when the said connecting members are united said means will hold the parts together, and associating solder-like means having a coating of flux only on one side thereof with the connecting member having the recess therein so that the fluxed coating will be only on the side of the solder-like means towards the other connecting member when the said members are in assembled relation with each other and so that the solder-like means will be held in said recess and in spaced relation with the ends of said connecting member, said flux and solder-like means being so located relative to the assembled parts and having such characteristics that when heat is applied thereto the solder-like means will first melt on the fluxed side thereof and flow in the groove between the parts and when allowed to cool will harden and integrally unite the same, placing said connecting members and parts in assembled relation with each other, and applying heat to said connecting members to cause said solder-like means to melt and flow and allowing the same to cool and secure the said members together.

2. Connecting means for uniting the parts of an opthalmic mounting comprising a connecting member having a recess and another connecting member having a projection adapted to be extended within said recess, said projection having a groove, which when the said members are in assembled relation with each other, will lie between the contiguous surfaces thereof, each of said connecting members having means which during use will positively associate them with the parts of the mounting, so that when the said connecting members are united, said means will hold the parts together, solder-like means normally frictionally retained in the recess of the first connecting member and having a coating of flux only on the side thereof towards the other connecting member when the said members are in assembled relation with each other, so that the solder-like means will be held in said recess in spaced relation with the ends of said first connecting member, said flux and solder-like means being so located relative to the assembled parts and having such characteristics that when heat is applied thereto the solder-like means will first melt on the fluxed side thereof and flow in the groove between the parts and when allowed to cool will harden and integrally unite the same, said connecting members being adapted to assume an interfitting relation with each other and with said parts to hold them in proper aligned relation, and being secured together by applying heat thereto to cause a solder-like means to melt and flow between said members and, when cool, to join said members and thereby secure said parts in desired assembled relation with each other.

EDWARD M. SPLAINE.
TRACY C. JARRETT.